US012618709B2

(12) United States Patent
Vande Brake et al.

(10) Patent No.: US 12,618,709 B2
(45) Date of Patent: May 5, 2026

(54) ION BEAM TIME OF ARRIVAL (TOA) GAUGE

(71) Applicant: Analex Corporation, Chantilly, VA (US)

(72) Inventors: Todd Evan Vande Brake, Peyton, CO (US); Gary Lee Paderewski, Colorado Springs, CO (US); George Williams, Colorado Springs, CO (US)

(73) Assignee: Analex Corporation, Chantilly, VA (US)

( * ) Notice: Subject to any disclaimer, the term of this patent is extended or adjusted under 35 U.S.C. 154(b) by 314 days.

(21) Appl. No.: 18/415,718

(22) Filed: Jan. 18, 2024

(65) Prior Publication Data

US 2025/0237546 A1     Jul. 24, 2025

(51) Int. Cl.

| | |
|---|---|
| *G01J 1/16* | (2006.01) |
| *C08L 33/12* | (2006.01) |
| *G01J 1/02* | (2006.01) |
| *G01J 1/04* | (2006.01) |
| *G01N 21/74* | (2006.01) |
| *G02B 1/04* | (2006.01) |
| *G01N 21/01* | (2006.01) |
| *G01N 21/62* | (2006.01) |

(52) U.S. Cl.
CPC ................. *G01J 1/16* (2013.01); *C08L 33/12* (2013.01); *G01J 1/0223* (2013.01); *G01J 1/0271* (2013.01); *G01J 1/0407* (2013.01); *G01N 21/74* (2013.01); *G02B 1/04* (2013.01); *G01J 1/0204* (2013.01); *G01J 2001/1605* (2013.01); *G01N 2021/0112* (2013.01); *G01N 2021/625* (2013.01); *G01N 2201/06113* (2013.01)

(58) Field of Classification Search
None
See application file for complete search history.

(56) References Cited

U.S. PATENT DOCUMENTS

| | | | | | |
|---|---|---|---|---|---|
| 5,162,649 | A | * | 11/1992 | Burke | .................. G01N 27/622 250/281 |
| 8,711,336 | B1 | * | 4/2014 | Frogget | ................... G01S 17/58 356/27 |
| 2009/0114813 | A1 | * | 5/2009 | Koo | ..................... H01J 37/3171 250/287 |
| 2016/0003672 | A1 | * | 1/2016 | Nam | ..................... G01J 1/4228 250/208.2 |
| 2016/0336161 | A1 | * | 11/2016 | Grothe, Jr. | .............. H01J 49/22 |

\* cited by examiner

*Primary Examiner* — Marcus H Taningco
(74) *Attorney, Agent, or Firm* — Morrison & Foerster LLP

(57) ABSTRACT

A gauge that is configured to detect a time at which radiation enters the gauge. The gauge may include a member that is configured to transition from a first state to a second state upon receipt of the incoming radiation, and may include a light probe that is configured to detect when the member transitions to the second state. The gauge may provide for determining a time of arrival of the radiation at another gauge. For example, the gauge may correlate the time of arrival at the gauge with the another gauge, thereby providing for correlating a response time of a test specimen with actual exposure time of the test specimen to radiation (e.g., an ion beam).

20 Claims, 12 Drawing Sheets

62

62a

62b

Z

X

62'

ION BEAM TIME OF ARRIVAL (TOA) GAUGE

STATEMENT OF GOVERNMENTAL INTEREST

This invention was made with Government support under Contract No. N00030-20-C-0014 awarded by the United States Navy/Strategic Systems Programs. The U.S. Government has certain rights in the invention.

TECHNICAL FIELD

The present disclosure relates generally to measurement devices and, in particular, gauges, such as gauges for determining an exposure time of specimens exposed to radiation (e.g., ion beam radiation).

BACKGROUND

Test samples are exposed to ion beam radiation provided by an ion beam generator at the GAMBLE II Ion Beam Facility of the U.S. Naval Research Laboratory. Measurement tools, such as phase doppler interferometry probes, may measure a response of each test sample to the ion beam radiation. For example, the phase doppler interferometry probes may measure a prompt impulse of each test sample. Also, calorimeters may provide data to determine the fluence of the ion beam radiation, and thus the total energy received by each test sample during a test event.

During the test event, there is a delay from the time at which the ion beam generator is triggered to fire and when ion beam radiation actually reaches the test specimens. Thus, an accurate timing mechanism is needed to correlate ion beam exposure time with test specimen response.

SUMMARY

The present application provides for a gauge that is configured to detect a time at which radiation enters the gauge. The gauge may include a member that is configured to transition from a first state to a second state upon receipt of the incoming radiation, and may include a light probe that is configured to detect when the member transitions to the second state. The gauge may provide for determining a time of arrival of the radiation at another gauge. For example, the gauge may correlate the time of arrival at the gauge with the another gauge, thereby providing for correlating a response time of a test specimen with actual exposure time of the test specimen to radiation (e.g., an ion beam).

The gauge may be used at the GAMBLE II Ion Beam facility located at the U.S. Naval Research Laboratory to determine the time of arrival of the ions onto the test specimen. Previously known test assemblies are not able to accurately correlate the response time of the test specimens with the actual exposure time to ions. The gauge of the present application, on the other hand, may provide for correlating such response time with the actual exposure time.

The gauge may be arranged such that the radiation arrives at the gauge at about the same time as the test specimen. For example, the gauge and the test specimen may be spaced at about the same distance from a radiation source such that the radiation reaches the gauge within 10 nanoseconds (ns) of the test specimen, or within 5 ns, 4 ns, 3 ns, 2 ns, or 1 ns. The gauge may be spaced from the radiation source a distance that within 10%, 9%, 8%, 7%, 6%, 5%, 4%, 3%, 2%, or 1% of a distance that the test specimen is spaced from the radiation source. The gauge and the test specimen may be mounted to the same gauge mount of a test cage such that a plane that is orthogonal to a longitudinal axis of the test cage extends through both the gauge and the test specimen.

The gauge may use a photonic displacement interferometry (PDI) to determine the ion beam time of arrival at the test specimen. For example, a laser probe may be focused through a polymethyl methacrylate (PMMA) window onto a vaporizable portion (e.g., an aluminized coating on the PMMA window). The vaporizable portion may be exposed to the ion beam through a small aperture on the TOA gauge directly in front of the vaporizable portion. The vaporizable portion may be vaporized when exposed to the ion beam, thereby causing a loss of signal from the PDI. Thus, the time of arrival of the ion beam at the specimen can be determined based on the time of the loss of signal.

The gauge may comprise an aperture at its front end that is followed by the aluminized PMMA window. The gauge may comprise a spacer (e.g., an acetal spacer) followed by a PMMA safety window. The PMMA safety window may protect the PDI laser probe from any blow off or spalling from the vaporizable portion.

The gauge may include a wave washer behind the safety window to take up play in the assembly stack up and account for any thickness variations in the individual components of the gauge.

According to an embodiment of the present disclosure, a gauge may include a housing defining an aperture. The gauge may also include a member configured to prevent a laser beam from traveling in a first direction beyond a location of the member when the member is in a first state. The member may be configured to transition from the first state to a second state in response to a radiation received by the member via the aperture. When in the second state, the member may be configured to allow the laser beam to travel beyond the location in the first direction. The gauge may furthermore include a light probe that is configured to detect when the member transitions to the second state by detecting when the laser beam travels beyond the location.

According to another embodiment of the present disclosure, a method may include directing a laser beam along a first direction to a member of a gauge, such that laser beam does not travel in the first direction beyond a location of the member while the member is in a first state. The method may furthermore include directing radiation to the member such that the member transitions to a second state, where the laser beam passes beyond the location along the first direction. The method may in addition include detecting, with a light probe, when the member transitions to the second state such that the laser beam travels beyond the location in the first direction. The method may moreover include determining a time of arrival of the radiation based on a time of the member transitioning to the second state such that the laser beam of the light probe passes beyond the location along the first direction.

Any of the features of the above and below disclosed embodiments of the electromagnetic calorimeter absorber and/or the calorimeter may be used in combination with one another.

BRIEF DESCRIPTION OF THE DRAWINGS

The foregoing summary, as well as the following detailed description of illustrative embodiments of the gauge of the present application, will be better understood when read in conjunction with the appended drawings. For the purposes of illustrating the apparatus of the present application, there is shown in the drawings illustrative embodiments. It should be understood, however, that the application is not limited to the precise arrangements and instrumentalities shown. In the drawings.

DETAILED DESCRIPTION OF ILLUSTRATIVE EMBODIMENTS

The present disclosure can be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the scope of the present disclosure. Also, as used in the specification including the appended claims, the singular forms "a," "an," and "the" include the plural, and reference to a particular numerical value includes at least that particular value, unless the context clearly dictates otherwise.

The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Figure 1A:
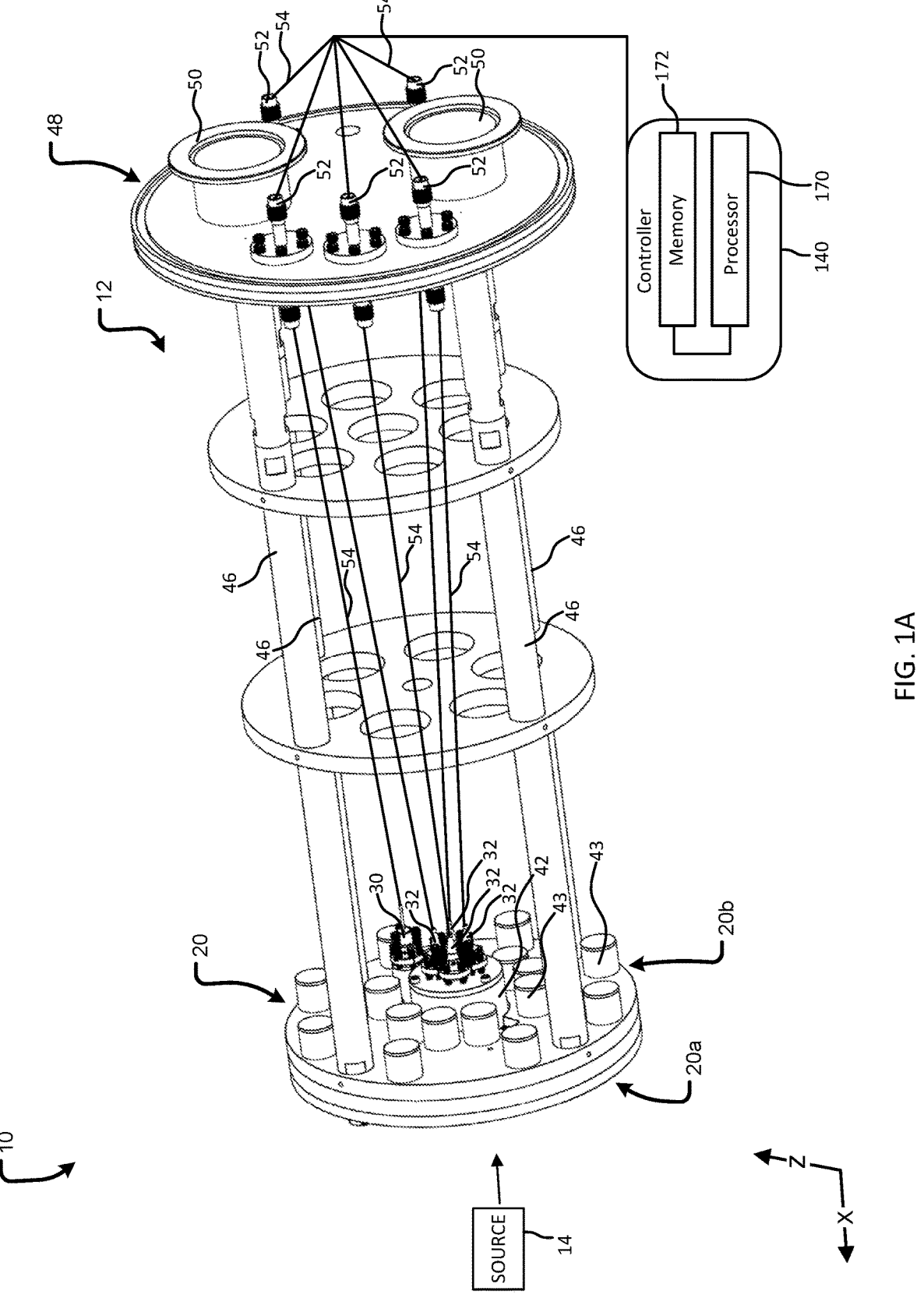
FIG. 1A is an oblique side view of a test system including a gauge configured to determine a time of arrival of radiation provided by a radiation source.
Figure 1B:
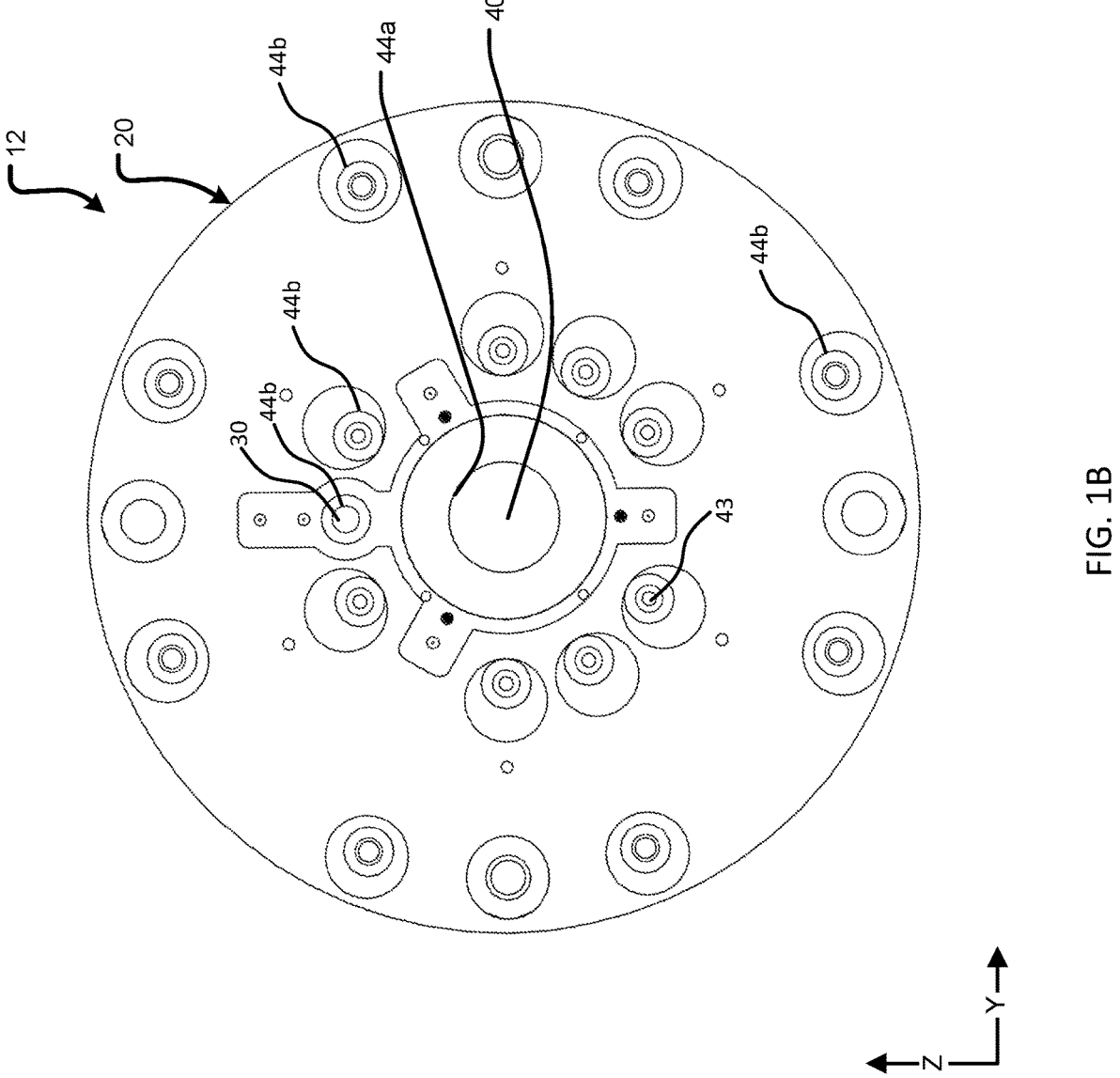
FIG. 1B is a front view of the test system of FIG. 1A.
Figure 2A:
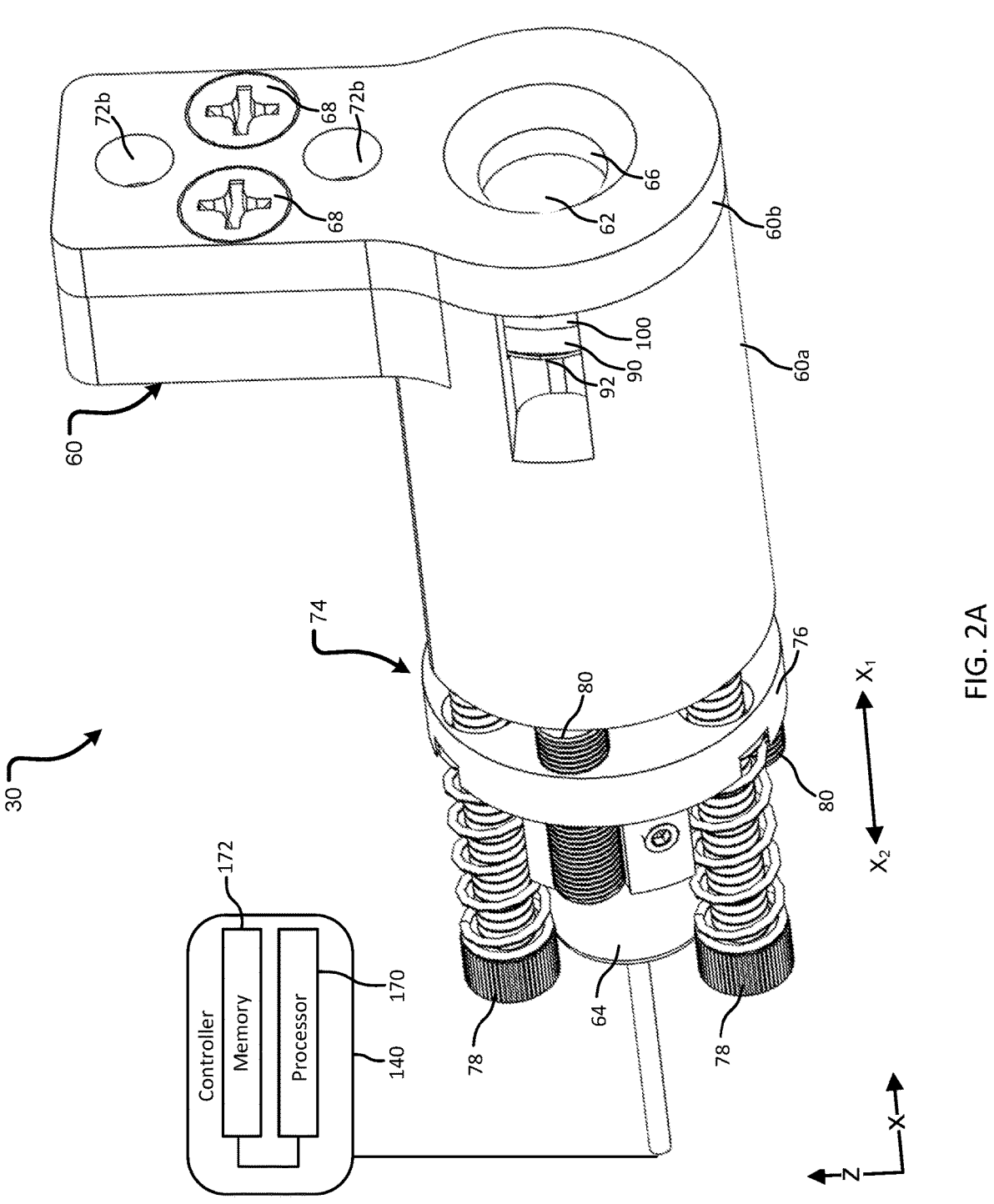
FIG. 2A is an oblique side view of the gauge of FIG. 1A.
Figure 2B:
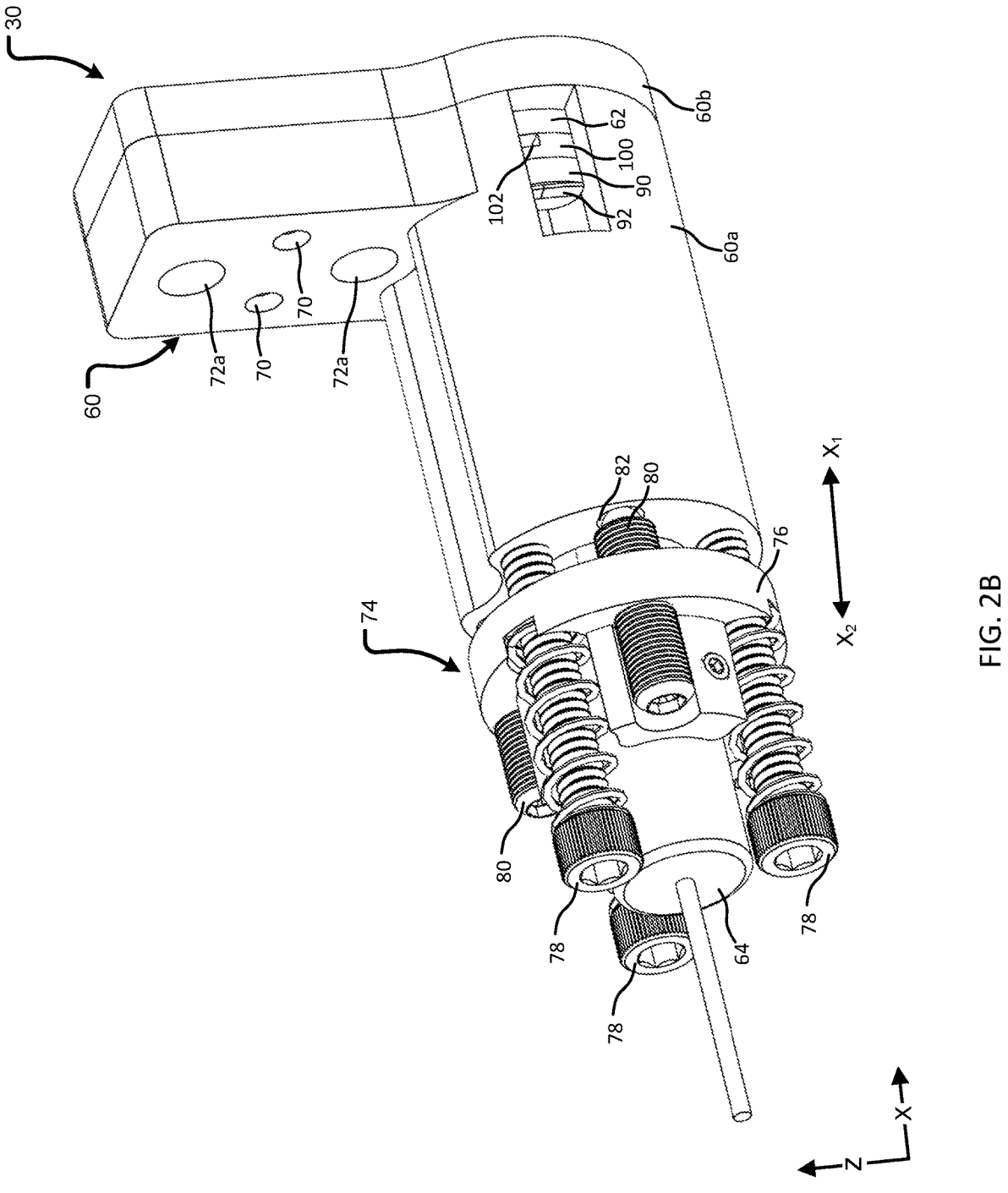
FIG. 2B is an oblique view of another side of the gauge of FIG. 2A.
Figure 3:
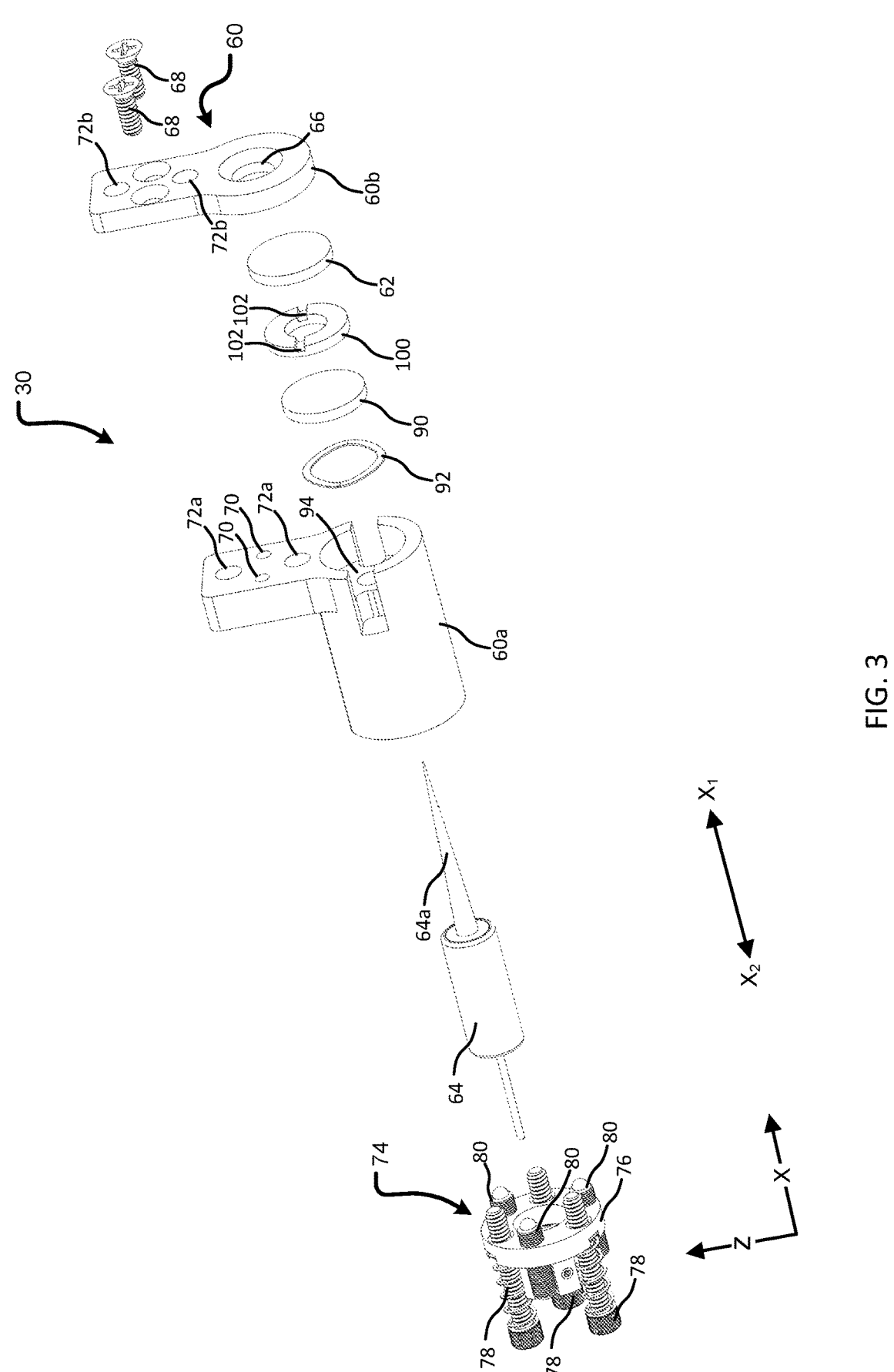
FIG. 3 is an oblique exploded side view of the gauge of FIG. 2A.
Figure 4:
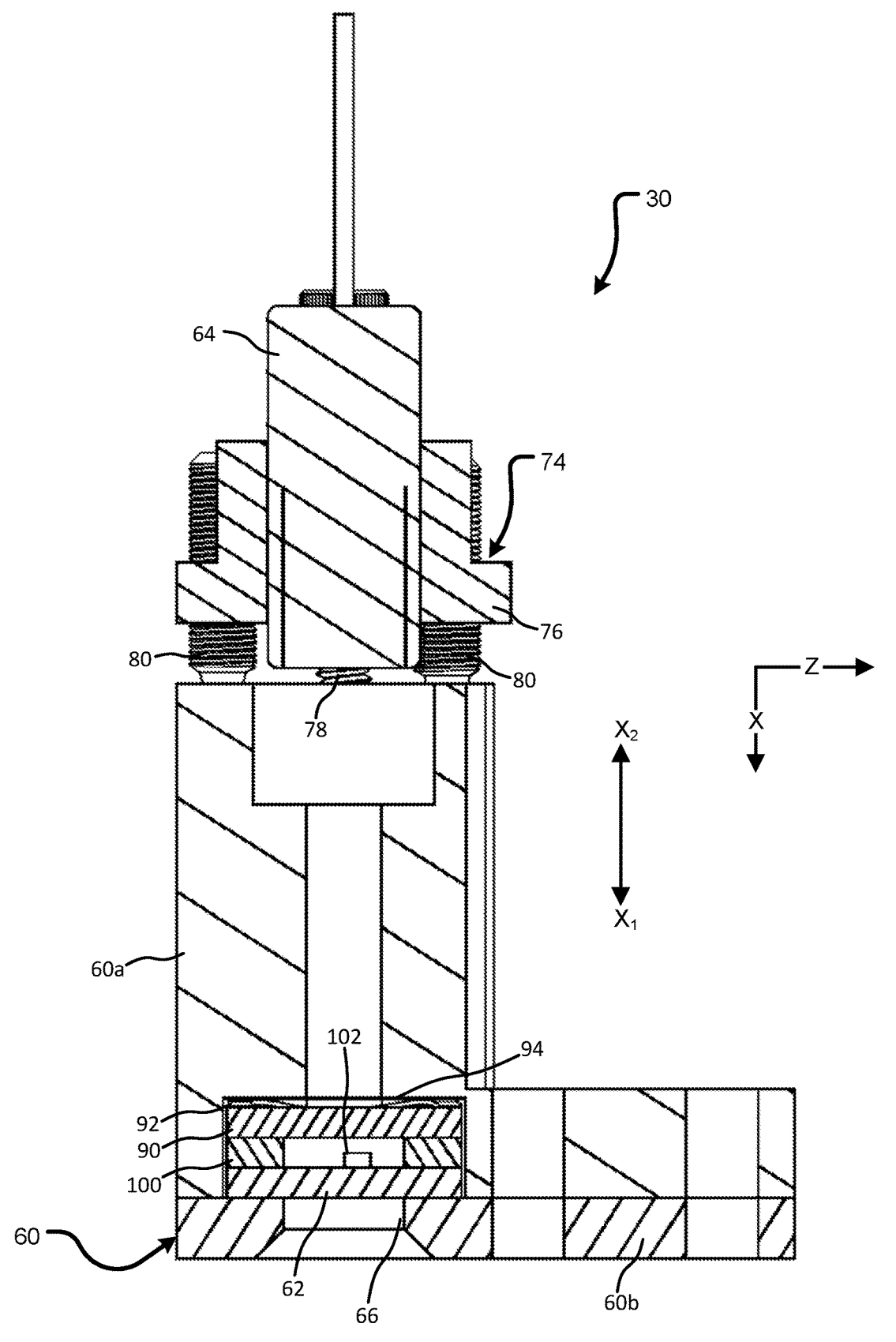
FIG. 4 is a side cross-sectional view of the gauge of FIG. 2A.

Referring to FIGS. 1A and 1B, a test system 10 is illustrated. The test system 10 may comprise a test cage 12, a radiation source 14, and a controller 140 that is operably coupled to the test cage 12. The test cage 12 may include a gauge mount 20, a gauge 30 that is configured to attach to the gauge mount 20. The test cage 12 may include one or more measurement devices 32 (e.g., one or more probes) that are configured to attach to the gauge mount 20.

The gauge mount 20 be configured to hold a test specimen 40 (shown in FIG. 1B). For example, the gauge mount 20 may include a specimen holder 42 that is configured to secure the test specimen 40 and configured to attach to the one or more measurement devices 32 such that the measurement devices 32 are configured to face the test specimen 40.

The measurement devices 32 may include, for example, one or more phase doppler interferometry probes that are each configured to measure a response of the test specimen 40 to a motivating event. For example, the radiation source 14 may generate ions that are directed to the test specimen 40, resulting in the motivating event, and each phase doppler interferometry probe may measure a prompt impulse of the test specimen 40 in response to the ions impinging the test specimen 40. The radiation source 14 may be configured to provide radiation with a fluence of 0.2-2.0 calories per centimeter squared (cal/cm$^2$) (e.g., an ion beam generator, such as the GAMBLE II generator at the U.S. Naval Research Laboratory, or an electromagnetic radiation generator.

Each phase doppler interferometry probe may include a light probe assembly, such as an optical probe assembly that may be configured to connect to an infrared laser, or configured to produce an infrared laser beam to measure the prompt impulse of the test specimen 40. In an embodiment, one or more of the phase doppler interferometry probes may include an entire prompt impulse gauge configured to measure the prompt impulse of the test specimen.

The test cage 12 may include one or more other measurement devices 43 (e.g., one or more calorimeters) that are configured to attach to the gauge mount 20 are configured to measure energy from the radiation source 14. For example, each calorimeter may be configured to derive the energy deposited from the radiation source 14 by converting the radiation energy (e.g., ions or electromagnetic radiation, such as X-rays) into heat. For example, each calorimeter may be of the type configured to mount to a test snout in a test chamber during testing at NIF at Lawrence Livermore National Labs.

The gauge mount 20 may comprise one or more apertures 44a, 44b that are configured to allow radiation to move pass through a first end 20a of the gauge mount 20 and to a second end 20b of the gauge mount 20 along a first direction. For example, the aperture 44a may extend through the first end of the gauge mount 20 along a longitudinal axis X, such that the ions generated by the radiation source 14 reach the test specimen 40. The apertures 44b may extend through the first end of the gauge mount 20 along the longitudinal axis X, such that the ions generated by the radiation source 14 reach the gauge 30 and the other measurement devices 43.

The test cage 12 may include one or more longitudinally extending supports 46 that extend from the gauge mount 20 to an endpiece 48. The endpiece 48 may define a cylindrical body and vacuum ports 50 that are configured to provide a cabling path between an interior and an exterior of the test cage 12. In some embodiments, one or more of the vacuum ports 50 are closed (e.g., blanked off) such that fluid cannot flow through such closed vacuum ports 50. Regardless of whether cabling extends into each of the vacuum ports 50, each vacuum port 50 may provide for a sealed configuration such that the interior of the test cage 12—thus the gauge 30, the measurement devices 32, and the other measurement devices 43—can be subjected to a vacuum environment when the test cage 12 is encapsulated in a test environment.

The test cage 12 may include one or more cable ports 52. For example, the cable ports 52 may extend through the endpiece 48 and be configured to provide a passage for wirings 54 (e.g., fiber optic cables leading to the measurement devices 32, as schematically represented by solid lines in FIG. 1A) to enter the interior of the test cage 12 and operably connect the gauge 30, the measurement devices 32, and the other measurement devices 43 to the controller 140.

In an embodiment, one or more of the wirings 54 may be integral with a respective one of the measurement devices 32.

The controller 140 may be configured to send and/or receive signals to receive information from or direct operation of the gauge 30 and each of the other components of the test system 10 (e.g., the measurement devices 32 and the other measurement devices 43). For example, the controller 140 may be configured to receive data (e.g., voltage output) from the gauge 30, the measurement devices 32, and the other measurement devices 43 (e.g., via a wiring harness or terminal). The controller 140 may be configured to store information received from the gauge 30, the measurement devices 32, and the other measurement devices 43, for example, in the memory 172.

The controller 140 may include, or be operatively connected to, one or more the gauge 30, the measurement devices 32, and the other measurement devices 43 and/or other sensors configured to detect and measure various other parameters of the radiation and/or the response of the test specimen 40.

The processor 170 may be configured to connect with and communicate with the memory 172, which may be configured to receive and store the measured values. The memory 172 may include a random access memory (RAM) and/or a computer-readable storage medium, such as a read-only memory (ROM) or non-volatile RAM (NVRAM), for storing basic routines for starting and/or operating the processor 170, which may be configured as a controller, and/or another component of the test system 10 and to transfer information between the various components and devices of the test system 10. The memory 172 may also store other software components necessary for the operation of the processor 170 and/or other components of the test system 10 including an operating system, software implementing a cleaning method as described herein, and/or the like. The processor 170 may include, or may be connected to, or otherwise in communication with, computer-readable storage media to store and retrieve information, such as program modules, data structures, or other data. It should be appreciated by those skilled in the art that computer-readable storage media may be any available media that provides for the storage of non-transitory data and that may be accessed by the processor 170. By way of non-limiting example, the computer-readable storage media may include volatile and non-volatile storage media, transitory computer-readable storage media, non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

Turning to FIGS. 2A-4, the gauge 30 may include a housing 60, a member 62, and a light probe 64. For example, the housing 60 may define an aperture 66 that is configured to receive the radiation from the radiation source 14.

The housing 60 may include a main body 60a and a faceplate 60b. The faceplate 60b may be configured to attach to the main body 60a. For example, the housing 60 may include fasteners 68 that are configured to extend through openings of the faceplate 60b into threaded openings 70 of the main body 60a to fix the faceplate 60b to the main body 60a. In some embodiments, the faceplate 60b defines the aperture 66, such that fixing the faceplate 60b to the main body 60a fixes the aperture 66 relative to the entire housing 60.

The main body 60a and the faceplate 60b may be configured to attach to the gauge mount 20 (shown in FIG. 1A). For example, the main body 60a and the faceplate 60b may include corresponding through holes 72a, 72b that are configured to receive respective fasteners (e.g., two #6-32 socket cap screws, not shown) to fix the housing 60 to the gauge mount 20.

The housing 60 may comprise aluminum (e.g., 6061-T6 aluminum). For example, both the entire main body 60a and the entire faceplate 60b may comprise aluminum. In some embodiments, the housing comprises different materials (e.g., another metal).

The light probe 64 (e.g., a laser probe) may be configured to direct a laser beam 64a (schematically represented in FIG. 3) to the member in a first direction $X_1$ along a longitudinal axis X (e.g., toward the aperture 66). In an embodiment, the laser beam 64a is a visible laser beam. In another embodiment, the laser beam is an invisible laser beam. For example, the light probe 64 may be configured to connect to an infrared laser, or configured to produce an infrared laser beam.

The member 62 may be configured to prevent the laser beam 64a from traveling in a first direction along a longitudinal axis X beyond a location of the member 62 when the member 62 is in a first state. As discussed further below with respect to FIGS. 5A-5B, the member 62 may be configured to transition from the first state to a second state such that the laser beam 64a is allowed to travel in the first direction $X_1$ beyond the location of the member 62. For example, the radiation generated by the radiation source 14 may enter the aperture 66 and be received by the member 62.

When the gauge 30 is attached to the gauge mount 20, the member 62 may be spaced from the radiation source 14 along the longitudinal axis X about the same distance as the test specimen 40. For example, the member 62 and the test specimen may not be offset from one another along the longitudinal axis X. In some embodiments, the member and the test specimen are within 0.125 inches (in) of one another (e.g., within 0.040 in to 0.125 in of one another) along the longitudinal axis, such that the radiation reaches the test specimen 40 and the member 62 at about the same time. In some embodiments, the member and the test specimen are within 0.040 in (e.g., within 0.010 in to 0.040 in) of one another along the longitudinal axis. In some embodiments, the member and the test specimen are within 0.010 in of one another along the longitudinal axis.

In response to receiving the radiation the member 62 may transition to the second state. When in the second state, the member 62 may be configured to allow the laser beam 64a to travel beyond the location in the first direction.

The light probe 64 may be configured to detect when the member 62 transitions to the second state by detecting when the laser beam 64a travels beyond the location. For example, when in the first state the member 62 may be configured to reflect the laser beam 64a at the location of the member 62 in a second direction $X_2$ that is opposite the first direction $X_1$ along the longitudinal axis X. The light probe 64 may be configured to direct the laser beam 64a to the member 62 such that the reflection of the laser beam 64a is detectable by the light probe 64 when the member 62 is in the first state.

Accordingly, when the member 62 is in the second state the laser beam 64a may not be reflected by the member 62, such that the laser beam 64a passes beyond the location along the first direction $X_1$. The light probe 64, thus, may be configured to detect when the radiation is received by the member 62 based on the time of the member 62 transitioning into the second state such that the light probe 64 no longer detects the reflection of the laser beam 64a.

The gauge 30 may comprise a probe adjuster 74 that is configured to adjust a focus and/or a tip tilt of the light probe 64. For example, main body 60a may define a probe adjuster base that is configured to engage the probe adjuster 74.

For example, the probe adjuster 74 may include an adjuster body 76 that is configured to hold the light probe 64. The light probe adjuster 74 may include three spring loaded screws 78 that are configured to threaded engage with complementary threading of the main body 60a. For example, the spring loaded screws 78 may at least partially fix the light probe 64 to the main body 60a. The spring loaded screws 78 may resist movement of the adjuster body 76 in the second direction $D_2$ such that spring loaded screws resist movement of the light probe 64 in the second direction $D_2$. In an embodiment, the light probe adjuster includes less than three spring loaded screws. In another embodiment, the light probe adjuster includes more than three spring loaded screws.

The light probe adjuster 74 may include three set screws 80 (e.g., three ball end set screws, each an example of an adjustment member) that are configured to adjust the position of the adjuster body 76 along the longitudinal axis X and/or configured to adjust an angle of the adjuster body 76 relative to the longitudinal axis X. For example, the set screws 80 may threadedly engage with the adjuster body 76 and abut a rear end of the main body 60a. Rotation of one of the set screws 80 in a first rotational direction may move a corresponding portion of the adjuster body 76 and the light probe 64 in the first direction $D_1$ and rotation of one or more of the set screws 80 in a second rotational direction may move the corresponding portion of the adjuster body 76 and the light probe 64 in the second direction $D_2$. Thus, the distance from the member 62 and/or the angle relative to the longitudinal axis X, of the light probe 64 and its laser beam 64a, may be adjusted with the set screws 80.

The rear end of the main housing 60a may define one or more divots 82 that are configured to receive a respective set screw 80. In an embodiment, the probe adjuster includes less than three set screws (e.g., one or two set screws). In another embodiment, the light probe adjuster includes more than three set screws.

The light probe 64 may include an optic line configured to transmit data from the light probe 64 to the controller 140. For example, the light probe 64 may be a fiber optic laser probe that is operably coupled to an external laser source through a fiber optic cable the exits out a back end of the light probe 64.

The gauge 30 may include a window 90 that may protect the light probe 64. For example, the window 90 may be disposed between the aperture 66 and the light probe 64. The window 90 may include an optically transparent material (e.g., polymethyl methacrylate (PMMA)).

The gauge 30 may include a biasing member 92. The biasing member 92 may be configured to secure the member 62 within the housing 60. For example, the biasing member may be configured to compress along the longitudinal direction X between the member 62 and a radially inwardly extending shoulder 94 of the main body 60a. The biasing member 92 may be a wave spring. The biasing member 92 may comprise steel (e.g., spring steel or 302 stainless steel)

The gauge 30 may include a spacer 100 between the member 62 and the radially inwardly extending shoulder 94 of the housing 60. The spacer 100 may be ring shaped and comprise one or more vents 102. The vents 102 may extend along a lateral axis Y that is orthogonal to the longitudinal axis X and a normal axis Z. For example, the vents 102 may be notches in a front end of the spacer 100. The vents 102 may provide for venting of gas from behind the member 62 (e.g., when the test cage 12 is vacuum sealed). Thus, the vents 102 may provide for depressurizing a space between the window 90 and the member 62.

Figure 5A:
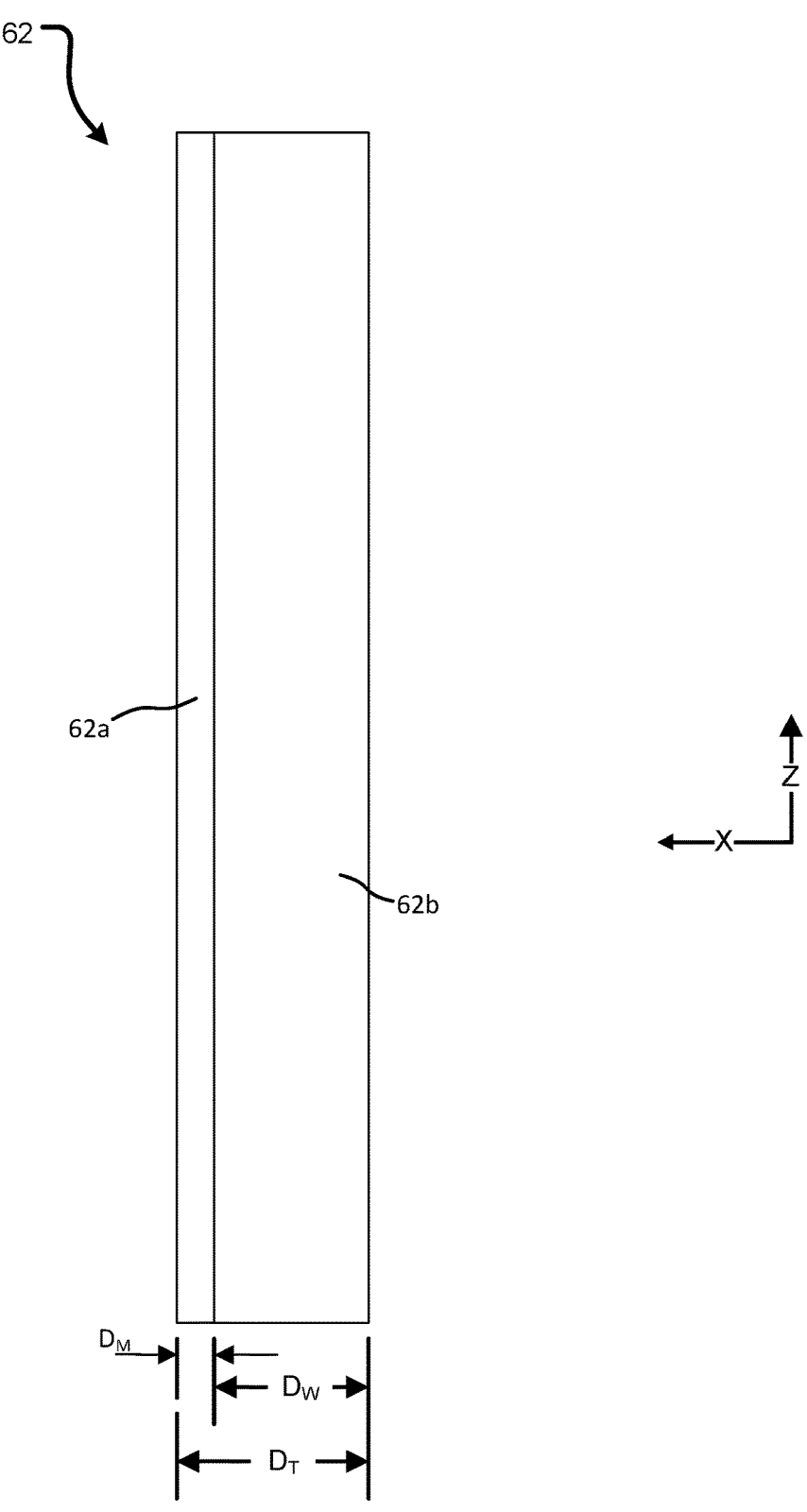
FIG. 5A is a side view of a member of the gauge of FIG. 1A in a first state.
Figure 5B:
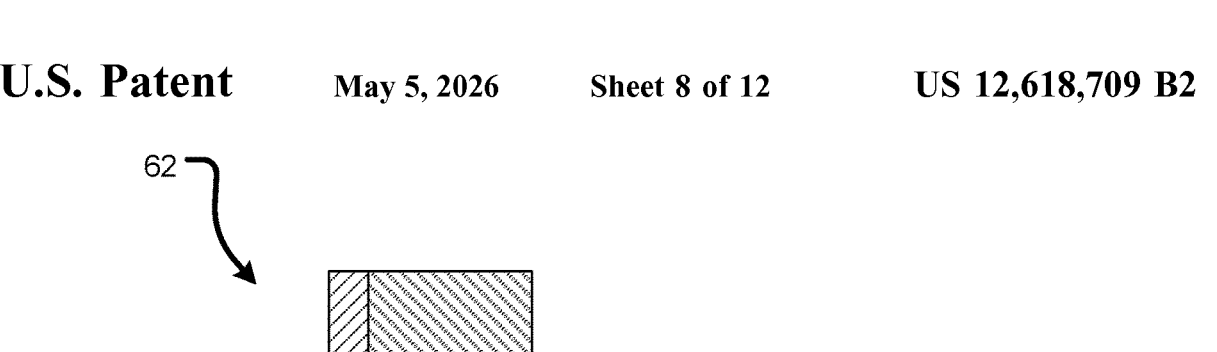
FIG. 5B is a side cross-sectional view of the member of FIG. 5A.
Figure 5B:
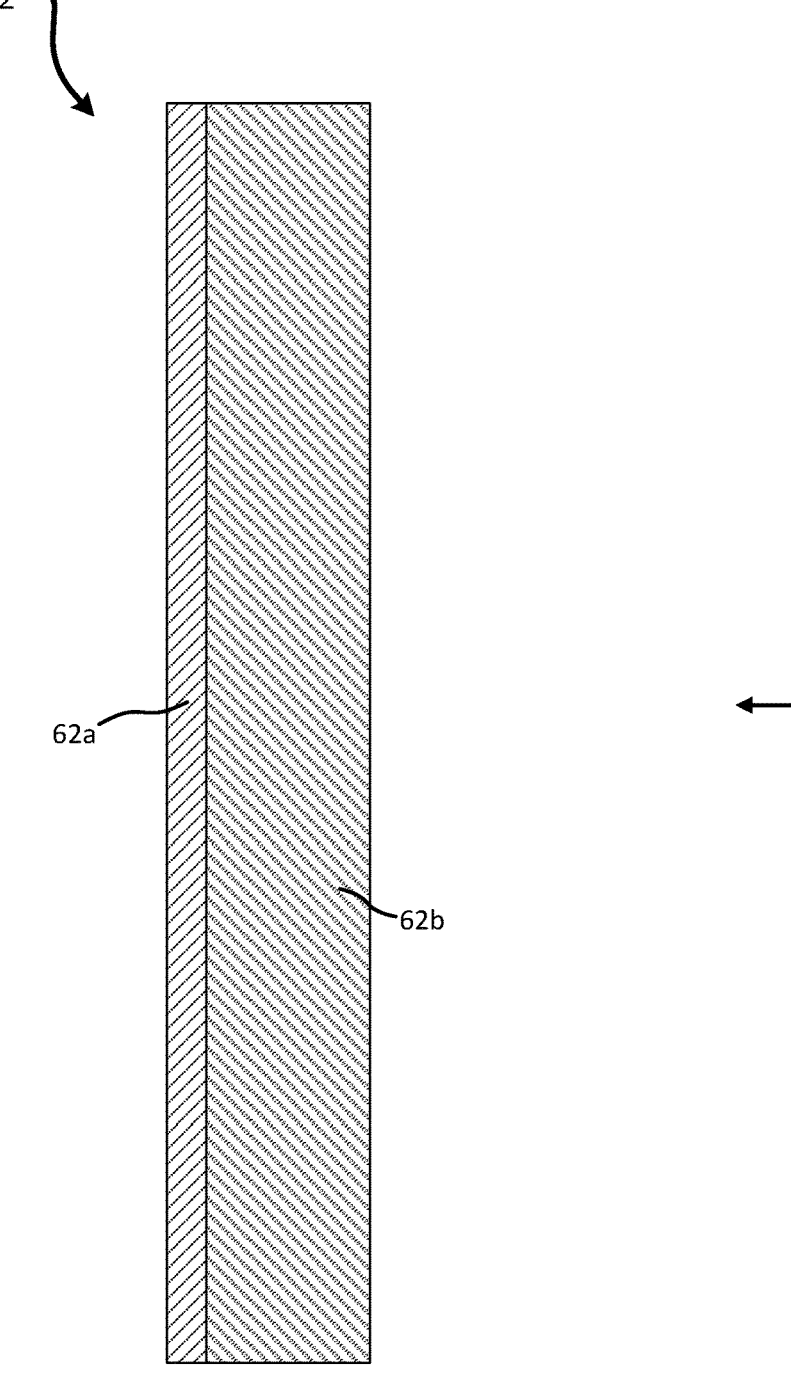
Figure 5C:
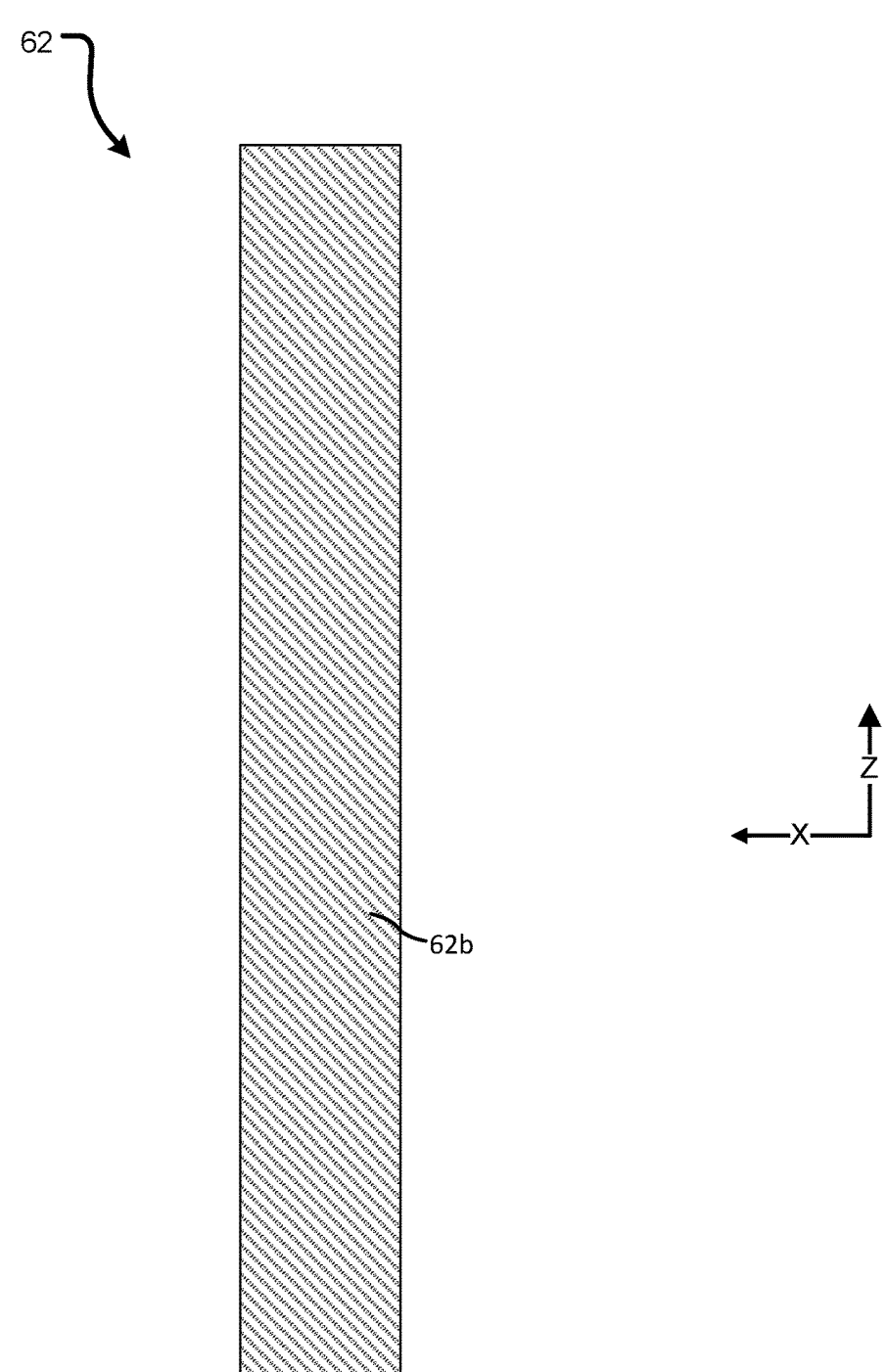
FIG. 5C is a side cross-sectional view of the member of FIG. 5A in a second state.

Referring now to FIGS. 5A-5C, the member 62 may include a vaporizable portion 62a. The member 62 may also include a transparent body 62b (an example of a transparent portion) that is attached to the vaporizable portion 62a. In an embodiment, the entire member is vaporizable.

The vaporizable portion 62a may include an aluminized coating. For example, the vaporizable portion 62a may be an aluminum vapor deposited coating on the transparent body 62b. In some embodiments, the vaporizable portion may be an aluminized polyethylene terephthalate (PET) film (e.g., an aluminized Mylar® film).

The vaporizable portion 62a may have a thickness $D_M$ anywhere from 200 nanometer (nm) (7.87 microinches (µin) to 355,000 nm (13979.4 pin) along the longitudinal axis X. For example, the thickness $D_M$ of the vaporizable portion 62a along the longitudinal axis X may be anywhere from 300 nm (11.8 µin) to 2,000 nm (78.7 µin). In some embodiments, the thickness $D_M$ may be anywhere from 2,000 nm (78.7 µin) to 50,000 nm (1,968.5 µin) (i.e., 0.002 mm to 0.05 mm).

When the member 62 is in the first state (as exemplified in FIGS. 5A and 5B), the transparent body 62b may be attached to the vaporizable portion 62a. The vaporizable portion 62a may be configured to reflect the laser beam 64a at the location of the member 62 back to the light probe 64. In some embodiments, the vaporizable portion coats an entire front surface of the transparent body. In other embodiments, the vaporizable portion coats only a portion of the front surface of the transparent body that receives the laser beam.

The transparent body 62b may be configured to receive the laser beam 64a (shown in FIG. 3) and allow the laser beam 64a to pass through the transparent body 62b. For example, the transparent body 62b may include PMMA. The transparent body 62b may have a thickness $D_W$ anywhere from 0.03 in (0.76 millimeters (mm) to 0.08 in (2.03 mm) along the longitudinal axis X. For example, the thickness $D_W$ of the transparent body 62b along the longitudinal axis X may be anywhere from 0.05 in (1.27 mm) to 0.07 in (1.78 mm). The thickness $D_W$ may be 0.0625 inches (1.5875 mm). In some embodiments, the thickness $D_W$ is greater than 0.08 in (2.03 mm), for example, up to 0.25 in (6.35 mm).

Thus, a total thickness $D_T$ of the member 62 may be anywhere from 0.03 in (0.762mm) to 0.26 in (6.6 mm) along the longitudinal axis X, anywhere from 0.0300079 in (0.76220 mm) to 0.263976 in (6.705 mm) along the longitudinal axis X, anywhere from 0.030001 in (0.7622 mm) to 0.081969 in (2.082 mm) along the longitudinal axis X, or anywhere from 0.050011 in (1.27 mm) to 0.070079 in (1.780 mm) along the longitudinal axis X.

In a second state of the member 62 (as exemplified in FIG. 5C), only the transparent body 62b may remain. For example, the entire vaporizable portion 62a may be vaporized, leaving only the transparent body 62b. In some embodiments, less than the entirety of the vaporizable portion 62a may be vaporized in response to being exposed to the radiation from the radiation source 14.

Referring again to FIGS. 1A-4, during use when the member 62 is in a first state, the laser beam 64a may be directed to the member 62 and reflect back to the light probe 64 such that the light probe 64 detects the reflected laser beam 64a. The laser beam 64a may thus be prevented from traveling along the first direction $X_1$ beyond the location of the member 62 while the member 62 is in the first state.

When the radiation from the radiation source 14 is directed to the test specimen 40 and the member 62, the member 62 may transition to the second state and a shock-wave may propagate through the test specimen 40 such that the test specimen 40 is displaced. For example, the vaporizable portion 62a may vaporize upon receipt of the radiation, thereby allowing the laser beam 64a to travel past the location of the member 62.

The controller 140 may determine a time of arrival of the radiation at the test specimen 40 based on the time of the member 62 transitioning to the second state such that the laser beam 64a of the light probe 64 passes beyond the location along the first direction.

The measurement devices 32 may measure a displacement of the test specimen 40 due to the shockwave and determine a prompt impulse of such. For example, the controller 140 may determine the prompt impulse based on the displacement of the test specimen 40 measured by the measurement devices 32.

The radiation source 14 may direct ions (or an X-ray or a laser) for 1 to 10 microseconds to the test specimen 40 from an ion generator (or X-ray generator or a laser generator) such that the shockwave propagates through the test specimen 40. The particle velocity in meters per second (m/s) may be represented over a span of 1 to 10 microseconds (µs), starting during or immediately after the motivating event (e.g., ion energy, X-ray energy, or direct laser energy directed at the test specimen 40). The particle velocity may be derived using photonic displacement interferometry with the measurement devices 32. The prompt impulse imparted onto the test specimen 40 may be determined based upon the particle velocity. For example, the resulting data may be processed by THRee-Interferometer-VElocimetry ("THRIVE") and/or Sandia InfraRed HEtrodyne analysis ("SIRHEN") to provide a particle velocity of the test specimen 12 versus time.

Figure 6A:
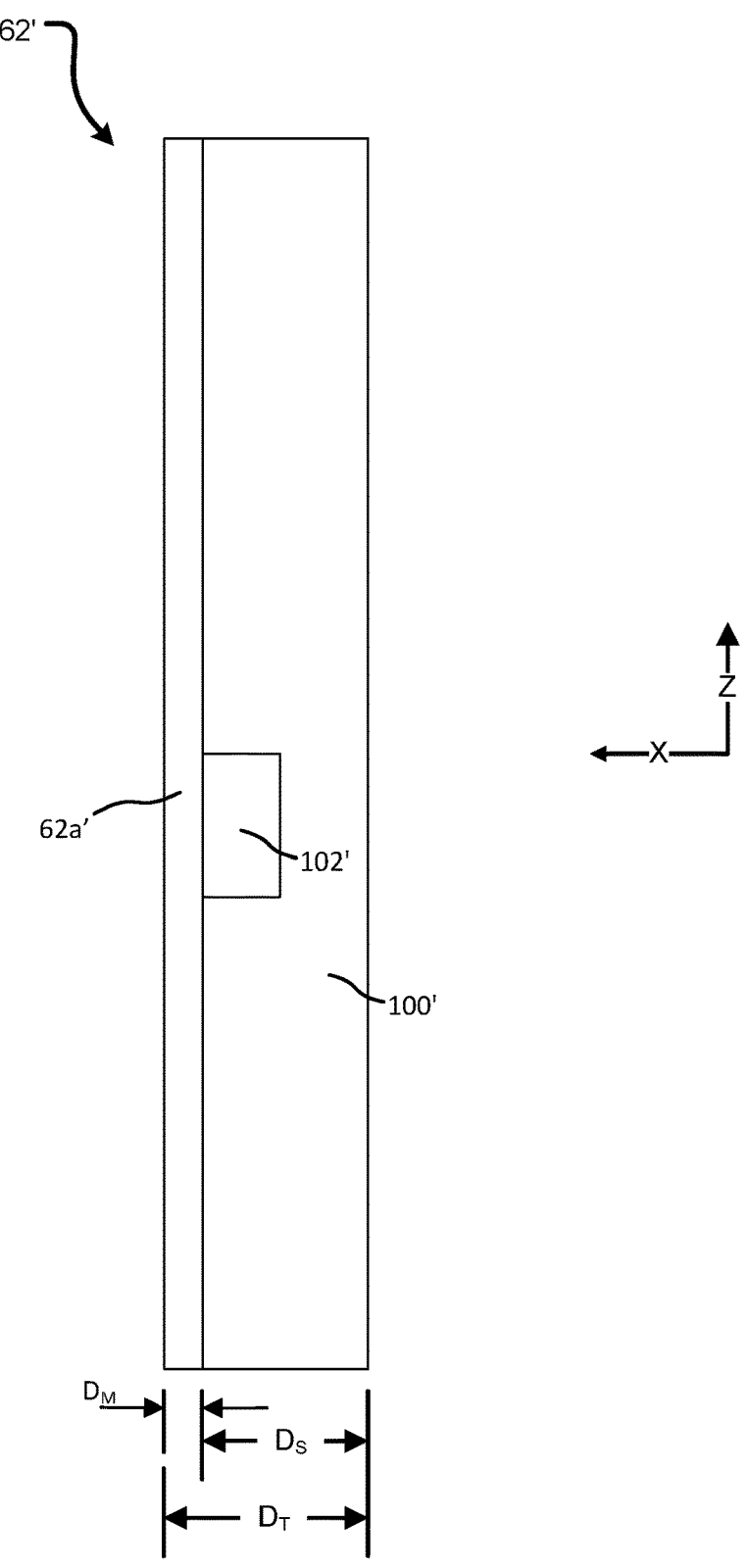
FIG. 6A is a side view of another embodiment of a member of the gauge of FIG. 1A in a first state.
Figure 6B:
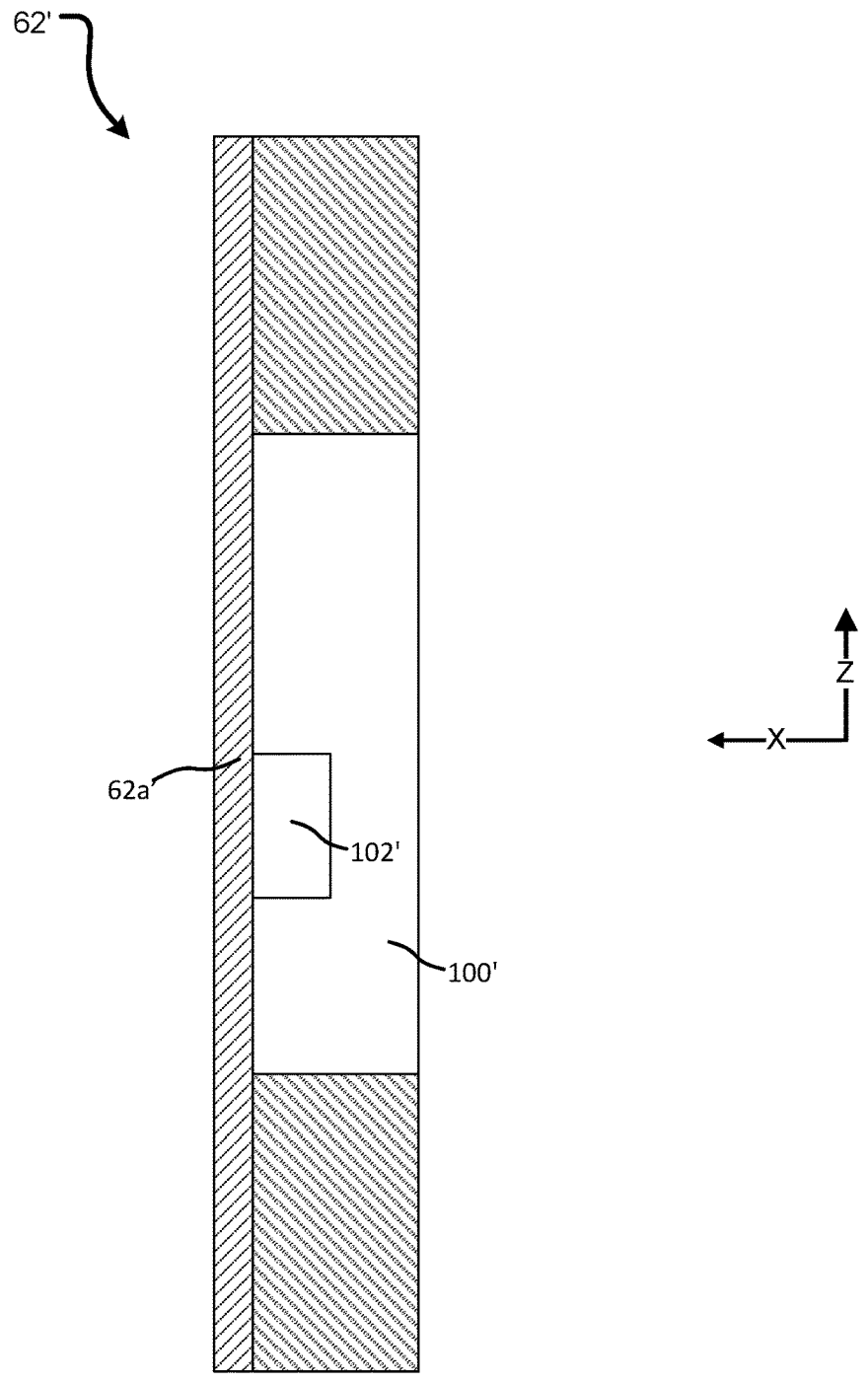
FIG. 6B is a side cross-sectional view of the member of FIG. 6A.
Figure 6C:
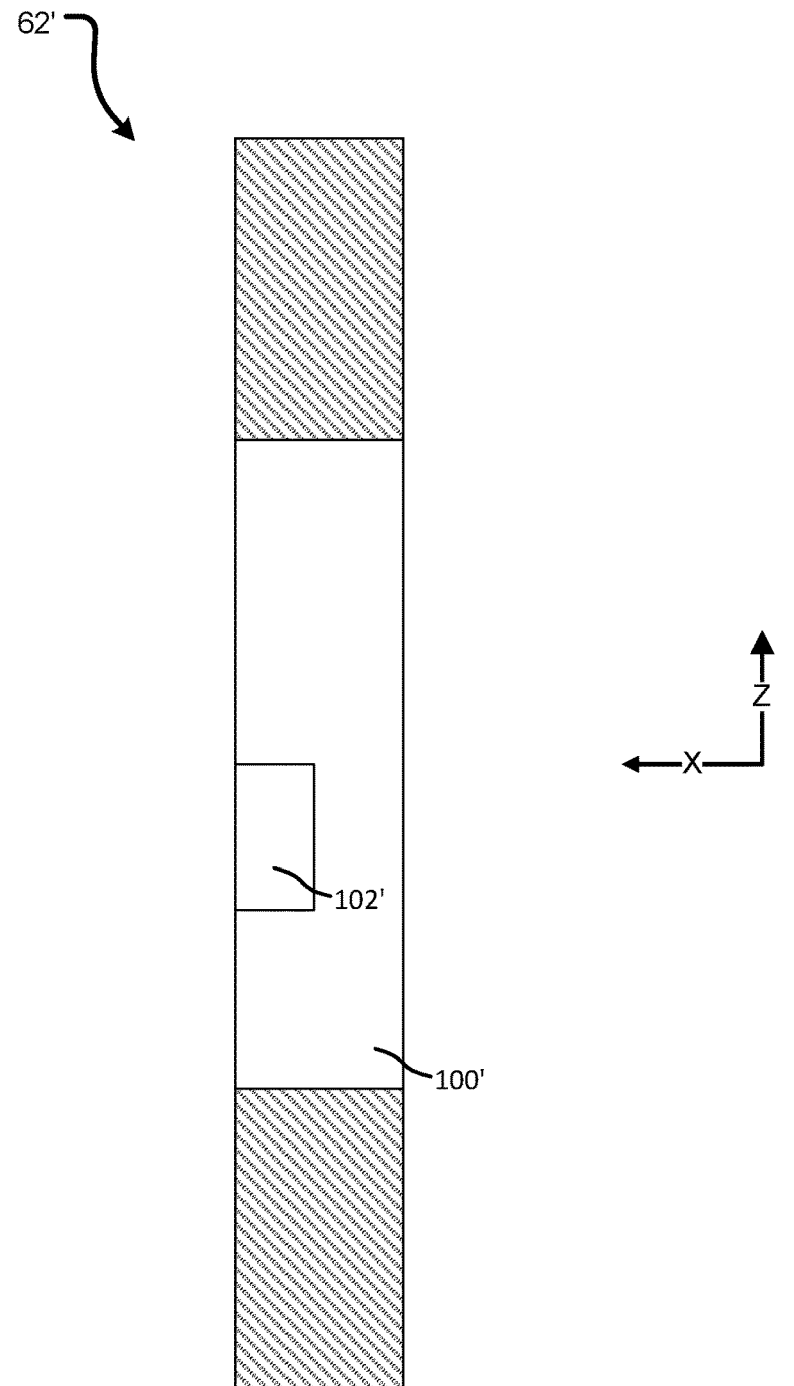
FIG. 6C is a side cross-sectional view of the member of FIG. 6A in a second state.

Referring now to FIGS. 6A-6C, a second embodiment of the member 62' is shown. It is to be appreciated that the second embodiment can be similar to the first embodiment of the member 62 shown in FIGS. 5A-5C, for example. Accordingly, the same reference numbers used above with reference to the first embodiment of the gauge 30 can be also used with a "prime" notation in reference to a second embodiment. It is also to be appreciated that, unless otherwise set forth below, the components (and features thereof) of the member 62' of the second embodiment can be similar to those of the member 62 and the spacer 100 of the first embodiment.

The vaporizable portion 62a' may be attached to a spacer 100'. For example, the vaporizable portion 62a' may be defined by an aluminized PET film that is attached to a ring-shaped body (e.g., a ring-shaped body that comprises acetal (polyoxymethylene) material) of the spacer 100'.

The vaporizable portion 62a' may be attached to the spacer 100' by an adhesive. For example, the aluminized PET film may be heated with a heat gun (not shown) when attached to the spacer 100', thereby causing the aluminized PET film to contract and become taut across the spacer 100'.

The taut aluminized PET film may be flat, and thus may be suitable for focusing the laser beam 64a.

When the aluminized PET film is exposed to the ions from the radiation source 14, the aluminized PET film may evaporate such that the signal from the light probe 64 may be lost. Thus, the time of arrival of the ion beam at the specimen can be determined based on the time of the loss of signal.

The spacer 100' may comprise one or more vents 102'. The vents 102' may extend along the lateral axis Y. For example, the vents 102' may be notches in a front end of the spacer 100'. The vents 102' may provide for venting of gas from behind the vaporizable portion 62a' (e.g., when the test cage 12 is vacuum sealed).

The vaporizable portion 62a' may have a thickness $D_M$ anywhere from 200 nm (7.87 microinches (µin) to 355,000 nm (13979.4 µin) along the longitudinal axis X. For example, the thickness $D_M$ of the vaporizable portion 62a' along the longitudinal axis X may be anywhere from 300 nm (11.8 µin) to 2,000 nm (78.7 µin). In some embodiments, the thickness $D_M$ may be anywhere from 2,000 nm (78.7 µin) to 50,000 nm (1,968.5 µin) (i.e., 0.002 mm to 0.05 mm).

The spacer 100' may have a thickness $D_S$ anywhere from 0.03 in (0.76 millimeters (mm) to 0.08 in (2.03 mm) along the longitudinal axis X. For example, the thickness $D_S$ of the spacer 100' along the longitudinal axis X may be anywhere from 0.05 in (1.27 mm) to 0.07 in (1.78 mm). The thickness $D_S$ may be 0.0625 inches (1.5875 mm). In some embodiments, the thickness $D_S$ is greater than 0.08 in (2.03 mm), for example, up to 0.25 in (6.35 mm).

Thus, a total thickness $D_T$ of the member 62' may be anywhere from 0.03 in (0.762 mm) to 0.26 in (6.6 mm) along the longitudinal axis X, anywhere from 0.0300079 in (0.76220 mm) to 0.263976 in (6.705 mm) along the longitudinal axis X, anywhere from 0.030001 in (0.7622 mm) to 0.081969 in (2.082 mm) along the longitudinal axis X, or anywhere from 0.050011 in (1.27 mm) to 0.070079 in (1.780 mm) along the longitudinal axis X.

When the member 62' is in the first state (as exemplified in FIGS. 6A and 6B), the spacer 100' may be attached to the vaporizable portion 62a'. The vaporizable portion 62a' may be configured to reflect the laser beam 64a at the location of the member 62' back to the light probe 64. In some embodiments, the vaporizable portion coats an entire front surface of the spacer 100' and spans an entirety of a central opening of the spacer 100'. In other embodiments, the vaporizable portion coats and/or spans only a portion of the front surface or the central opening that receives the laser beam.

In a second state of the member 62' (as exemplified in FIG. 6C), only the spacer 100' may remain. For example, the entire vaporizable portion 62a' may be vaporized, leaving only the spacer 100'. In some embodiments, less than the entirety of the vaporizable portion 62a' may be vaporized in response to being exposed to the radiation from the radiation source 14.

The following are a number of nonlimiting EXAMPLES of aspects of the disclosure.

A gauge may include a housing defining an aperture. The gauge may also include a member configured to prevent a laser beam from traveling in a first direction beyond a location of the member when the member is in a first state, where the member is configured to transition from the first state to a second state in response to a radiation received by the member via the aperture, where when in the second state the member is configured to allow the laser beam to travel beyond the location in the first direction. The gauge may furthermore include a light probe that is configured to detect when the member transitions to the second state by detecting when the laser beam travels beyond the location. Other embodiments of this aspect include corresponding computer systems, apparatus, and computer programs recorded on one or more computer storage devices, each configured to perform the actions of the methods.

Implementations may include one or more of the following features. The gauge where the member is configured to reflect the laser beam at the location of the member when in the first state, where the light probe is configured to direct the laser beam to the member in the first direction, where when the member is in the first state, the laser beam is reflected by the member at the location to the light probe in a second direction that is opposite the first direction, and where when the member is in the second state, the laser beam is not reflected by the member, such that the laser beam passes beyond the location along the first direction. The gauge where the light probe is configured to direct the laser beam along the first direction to the aperture. The gauge where the light probe is a laser probe. The gauge where the member may include is a vaporizable portion. The gauge where the vaporizable portion may include an aluminized coating that is configured to prevent the laser beam from traveling in the first direction beyond the location when the member is in the first state. The gauge where the vaporizable portion has a thickness anywhere from 200 nm to 355,000 nm thick along a longitudinal axis of the aperture. The gauge where the thickness of the vaporizable portion along the longitudinal axis is anywhere from 300 nm to 2,000 nm. The gauge where the member may include an optically transparent portion that is attached to the vaporizable portion when the member is in the first state, where the optically transparent portion is configured to receive the laser beam and allow the laser beam to pass through the optically transparent portion. The gauge where the optically transparent portion may include a polymethyl methacrylate (PMMA) and the vaporizable portion coats a surface of the optically transparent portion. The gauge may include a window that is disposed between the aperture and the light probe. The gauge where the window may include an optically transparent material. The gauge may include a spacer between the member and a radially inwardly extending shoulder of the housing. The gauge where the member may include the spacer and a vaporizable portion that is attached to the spacer. Gauge where the spacer may include a vent. The gauge may include a controller configured to determine a time of arrival of the radiation based on a time of the member transitioning to the second state such that the laser beam of the light probe passes beyond the location along the first direction. The gauge may include a biasing member between the member and a radially inwardly extending shoulder of the housing. The gauge where the light probe is disposed rearward of the aperture. The gauge may include a probe adjuster configured to adjust a focus and/or a tip tilt of the light probe. The gauge where the probe adjuster includes an adjuster body that is configured to receive the light probe. The gauge where the adjuster body defines an opening that the light probe is received within. The gauge where the probe adjuster includes one or more adjustment members that are configured to engage the housing. A test system attached to the gauge mount; and one or more phase doppler interferometry probes configured to measure a response of a test specimen to a motivating event. The test system where the gauge mount may include one or more apertures that are configured to allow radiation to move pass through a first end of the gauge mount and to a second end of the gauge mount along a first direction. The test system may include one or more calorimeters that are configured to measure energy from an energy source. A method of using the gauge or the test system, the method having: directing radiation to a test specimen such that a shockwave propagates through the test specimen; and determining a time of arrival of the radiation based on the time of the member transitioning to the second state such that the laser beam of the light probe passes beyond the location along the first direction. Implementations of the described techniques may include hardware, a method or process, or a computer tangible medium.

In one general aspect, a method may include directing a laser beam along a first direction to a member of a gauge, such that laser beam does not travel in the first direction beyond a location of the member while the member is in a first state. The method may furthermore include directing radiation to the member such that the member transitions to a second state, where the laser beam passes beyond the location along the first direction. The method may in addition include detecting, with a light probe, when the member transitions to the second state such that the laser beam travels beyond the location in the first direction. The method may moreover include determining a time of arrival of the radiation based on a time of the member transitioning to the second state such that the laser beam of the light probe passes beyond the location along the first direction. Other embodiments of this aspect include corresponding computer systems, apparatus, and computer programs recorded on one or more computer storage devices, each configured to perform the actions of the methods.

Implementations may include one or more of the following features. The method where the light probe directs the laser beam in the first direction to the member. The method may include blocking the laser beam, with the member, such that the laser beam is prevented from traveling in the first direction beyond the location of the member while the member is in the first state. The method where the blocking step may include reflecting the laser beam at the location of the member when the member is in the first state, where the light probe is configured to direct the laser beam to the member in the first direction, where when the member is in the first state, the laser beam is reflected by the member at the location to the light probe in a second direction that is opposite the first direction, and where when the member is in the second state, the laser beam is not reflected by the member, such that the laser beam passes beyond the location along the first direction. The method where the time of arrival is when the radiation arrives at a test specimen. The method where the time of arrival is determined based on a time at which the light probe determines that the laser beam is passing beyond the location along the first direction, where the member is in the second state. The method where transitioning the member to the second state may include vaporizing at least a portion of the member such that the laser beam passes beyond the location along the first direction. The method may include directing radiation to a test specimen such that a shockwave propagates through the test specimen. The method may include: producing a shockwave that propagates through the test specimen based on the radiation; measuring, with a measurement device, displacement of the test specimen due to the shockwave; and determining a prompt impulse based on the displacement of the test specimen measured by the measurement device. The method where the shockwave propagates through the test specimen for 1 to 10 microseconds. The method may include determining a prompt impulse, with a controller, based on the displacement of the test specimen measured by the light probe. The method may include holding a test specimen in a test specimen holder. Implementations of the described techniques may include hardware, a method or process, or a computer tangible medium.

It should be noted that the illustrations and descriptions of the examples shown in the figures are for exemplary purposes only, and should not be construed limiting the disclosure. One skilled in the art will appreciate that the present disclosure contemplates various examples. Additionally, it should be understood that the concepts described above with the above-described examples may be employed alone or in combination with any of the other examples described above. It should further be appreciated that the various alternative examples described above with respect to one illustrated example can apply to all examples as described herein, unless otherwise indicated.

Conditional language used herein, such as, among others, "can," "could,"

"might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more examples or that one or more examples necessarily include these features, elements and/or steps. The terms "comprising," "including," "having," and the like are synonymous and are used inclusively, in an open-ended fashion, and do not exclude additional elements, features, acts, operations, and so forth.

Although the disclosure has been described in detail, it should be understood that various changes, substitutions, and alterations can be made herein without departing from the spirit and scope of the present disclosure as defined by the appended claims. Additionally, any of the embodiments disclosed herein can incorporate features disclosed with respect to any of the other embodiments disclosed herein. Moreover, the scope of the present disclosure is not intended to be limited to the particular embodiments described in the specification. As one of ordinary skill in the art will readily appreciate from that processes, machines, manufacture, composition of matter, means, methods, or steps, presently existing or later to be developed that perform substantially the same function or achieve substantially the same result as the corresponding embodiments described herein may be utilized according to the present disclosure.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

It will be understood that reference herein to "a" or "one" to describe a feature such as a component or step does not foreclose additional features or multiples of the feature. For instance, reference to a device having or defining "one" of a feature does not preclude the device from having or defining more than one of the feature, as long as the device has or defines at least one of the feature. Similarly, reference herein to "one of" a plurality of features does not foreclose the invention from including two or more, up to all, of the features. For instance, reference to a device having or defining "one of a X and Y" does not foreclose the device from having both the X and Y.

What is claimed:

1. A gauge comprising:

a housing defining an aperture;

a member configured to prevent a laser beam from traveling in a first direction beyond a location of the member when the member is in a first state, wherein the member is configured to transition from the first state to a second state in response to a radiation received by the member via the aperture, wherein when in the second state the member is configured to allow the laser beam to travel beyond the location in the first direction; and a light probe that is configured to detect when the member transitions to the second state by detecting when the laser beam travels beyond the location.

2. The gauge of claim 1, wherein the member is configured to reflect the laser beam at the location of the member when in the first state, wherein the light probe is configured to direct the laser beam to the member in the first direction, wherein when the member is in the first state, the laser beam is reflected by the member at the location to the light probe in a second direction that is opposite the first direction, and wherein when the member is in the second state, the laser beam is not reflected by the member, such that the laser beam passes beyond the location along the first direction.

3. The gauge of claim 2, wherein the light probe is configured to direct the laser beam along the first direction to the aperture.

4. The gauge of claim 1, wherein the member comprises is a vaporizable portion.

5. The gauge of claim 4, wherein the vaporizable portion comprises an aluminized coating that is configured to prevent the laser beam from traveling in the first direction beyond the location when the member is in the first state.

6. The gauge of claim 4, wherein the vaporizable portion has a thickness anywhere from 200 nm to 355,000 nm thick along a longitudinal axis of the aperture.

7. The gauge of claim 5, wherein the member comprises an optically transparent portion that is attached to the vaporizable portion when the member is in the first state, wherein the optically transparent portion is configured to receive the laser beam and allow the laser beam to pass through the optically transparent portion.

8. The gauge of claim 7, wherein the optically transparent portion comprises a polymethyl methacrylate (PMMA) and the vaporizable portion coats a surface of the optically transparent portion.

9. The gauge of claim 1, further comprising a window that is disposed between the aperture and the light probe.

10. The gauge of claim 1, further comprising a spacer between at least a portion of the member and a radially inwardly extending shoulder of the housing.

11. The gauge of claim 10, wherein the member comprises the spacer and a vaporizable portion that is attached to the spacer.

12. The gauge of claim 1, further comprising a controller configured to determine a time of arrival of the radiation based on a time of the member transitioning to the second state such that the laser beam of the light probe passes beyond the location along the first direction.

13. The gauge of claim 1, further comprising a probe adjuster configured to adjust a focus and/or a tip tilt of the light probe.

14. A test system comprising:

a test cage comprising a gauge mount;

the gauge of claim 1 attached to the gauge mount; and one or more phase doppler interferometry probes configured to measure a response of a test specimen to a motivating event.

15. A method of operating the gauge of claim 1, the method comprising:

directing radiation to a test specimen such that a shockwave propagates through the test specimen; and determining a time of arrival of the radiation based on the time of the member transitioning to the second state such that the laser beam of the light probe passes beyond the location along the first direction.

16. A method of determining a time of arrival of radiation, the method comprising:

directing a laser beam along a first direction to a member of a gauge, such that laser beam does not travel in the first direction beyond a location of the member while the member is in a first state;

directing radiation to the member such that the member transitions to a second state, whereby the laser beam passes beyond the location along the first direction;

detecting, with a light probe, when the member transitions to the second state such that the laser beam travels beyond the location in the first direction; and determining a time of arrival of the radiation based on a time of the member transitioning to the second state such that the laser beam of the light probe passes beyond the location along the first direction.

17. The method of claim 16, further comprising blocking the laser beam, with the member, such that the laser beam is prevented from traveling in the first direction beyond the location of the member while the member is in the first state.

18. The method of claim 17, wherein the blocking step comprises reflecting the laser beam at the location of the member when the member is in the first state, wherein the light probe is configured to direct the laser beam to the member in the first direction, wherein when the member is in the first state, the laser beam is reflected by the member at the location to the light probe in a second direction that is opposite the first direction, and wherein when the member is in the second state, the laser beam is not reflected by the member, such that the laser beam passes beyond the location along the first direction.

19. The method of claim 16, wherein transitioning the member to the second state comprises vaporizing at least a portion of the member such that the laser beam passes beyond the location along the first direction.

20. The method of claim 16, further comprising:

directing radiation to a test specimen such that a shockwave propagates through the test specimen;

producing a shockwave that propagates through the test specimen based on the radiation;

measuring, with a measurement device, displacement of the test specimen due to the shockwave; and determining a prompt impulse based on the displacement of the test specimen measured by the measurement device.

* * * * *